United States Patent
Matsue et al.

(10) Patent No.: US 10,093,781 B2
(45) Date of Patent: Oct. 9, 2018

(54) FOAMED STYRENIC POLYMERS CONTAINING A BROMINATED STYRENE-BUTADIENE COPOLYMER AND HAVING ENHANCED CELL SIZE HOMOGENEITY

(71) Applicant: DOW GLOBAL TECHNOLOGIES LLC, Midland, MI (US)

(72) Inventors: Kenji Matsue, Tochigi-ken (JP); Naganori Nishioka, Tochigi-ken (JP); Yoshihiro Shirakawa, Tochigi-ken (JP); Lawrence S. Hood, Midland, MI (US); Shari L. Kram, Midland, MI (US); Stephane Costeux, Midland, MI (US); Mark A. Barger, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 128 days.

(21) Appl. No.: 14/917,005

(22) PCT Filed: Oct. 30, 2013

(86) PCT No.: PCT/US2013/067586
§ 371 (c)(1),
(2) Date: Mar. 5, 2016

(87) PCT Pub. No.: WO2015/065393
PCT Pub. Date: May 7, 2015

(65) Prior Publication Data
US 2016/0229970 A1    Aug. 11, 2016

(51) Int. Cl.
*C08J 9/00* (2006.01)
*C09K 21/14* (2006.01)
(Continued)

(52) U.S. Cl.
CPC ............. *C08J 9/0061* (2013.01); *C08J 9/122* (2013.01); *C08J 9/141* (2013.01); *C08L 25/06* (2013.01);
(Continued)

(58) Field of Classification Search
CPC ......... C08J 9/0061; C08J 9/122; C08L 25/06; C08L 25/10
See application file for complete search history.

(56) References Cited

U.S. PATENT DOCUMENTS

| 4,661,302 A | 4/1987 | Park |
| 5,262,556 A | 11/1993 | de Grave |

(Continued)

FOREIGN PATENT DOCUMENTS

| EP | 124958 A | 11/1984 |
| JP | H07-188452 A | 7/1995 |

(Continued)

OTHER PUBLICATIONS

Anastasiadis, Spiros H., Irena Gancarz, and Jeffrey T. Koberstein. "Compatibilizing effect of block copolymers added to the polymer/polymer interface." Macromolecules 22.3 (1989): 1449-1453.*

(Continued)

*Primary Examiner* — Nicholas E Hill

(57) ABSTRACT

Extruded polymer foams are made from a polymer composition that includes an unbrominated styrenic polymer, a brominated vinyl aromatic/butadiene flame retardant, and an unbrominated vinyl aromatic/butadiene polymer. The unbrominated vinyl aromatic/butadiene polymer improves the cell homogeneity.

12 Claims, 2 Drawing Sheets

(51) Int. Cl.
*C08L 25/06* (2006.01)
*C08L 25/12* (2006.01)
*C08J 9/12* (2006.01)
*C08J 9/14* (2006.01)

(52) U.S. Cl.
CPC .............. *C08L 25/12* (2013.01); *C09K 21/14* (2013.01); *C08J 2203/06* (2013.01); *C08J 2203/14* (2013.01); *C08J 2325/06* (2013.01); *C08J 2453/02* (2013.01); *C08L 2203/14* (2013.01); *C08L 2205/03* (2013.01); *C08L 2666/84* (2013.01)

(56) References Cited

U.S. PATENT DOCUMENTS

| | | |
|---|---|---|
| 5,496,864 A | 3/1996 | Henn |
| 6,034,143 A | 3/2000 | Morioka |
| 6,093,352 A | 7/2000 | Miller |
| 6,225,363 B1 | 5/2001 | Wilkes |
| 2008/0287559 A1 | 11/2008 | King |
| 2014/0364524 A1 | 12/2014 | Braun |

FOREIGN PATENT DOCUMENTS

| | | |
|---|---|---|
| WO | 2007/084665 A | 7/2007 |
| WO | 2013/081958 A | 6/2013 |
| WO | 2013/092322 A | 6/2013 |

OTHER PUBLICATIONS

Gaillard, Patrice, Mario Ossenbach-Sauter, and Gérard Riess. "Tensions interfaciales de systèmes polymères biphasiques en présence de copolymères séquencés." Macromolecular Rapid Communications 1.12 (1980): 771-774.*

Kaemmerlen et al., "Radiative Properties of extruded polystyrene . . . ", J. Quantitative Spectroscopy & Radiative Transfer 111 (2010) 865-877.

Placido et al., "Thermal Properties Predictive Model for Insulating Foams", Infrared Physics & Technology 46 (2005) 219-231.

* cited by examiner

FOAMED STYRENIC POLYMERS CONTAINING A BROMINATED STYRENE-BUTADIENE COPOLYMER AND HAVING ENHANCED CELL SIZE HOMOGENEITY

The present invention relates to foamed styrenic polymers containing a brominated styrene/butadiene copolymer flame retardant, and methods for making such foams.

Building codes typically require a certain level of flame retardancy performance. In North America, one measurement of flame retardancy performance is Limiting Oxygen Index (LOI) as determined by ASTM D2863. LOI values greater than 24% are considered favorable. A low molecular weight brominated compound, hexabromocyclododecane (HBCD) has been common practice for years as a flame retardant. However, HBCD is facing governmental regulation over environmental concerns. Therefore, there is a need for an alternative flame retardant for use in styrenic foam.

A variety of brominated compounds and brominated polymers have emerged as potential replacements for HBCD. Among these are brominated styrene/butadiene copolymers such as described, for example, in US published patent application 2008-0287559. In addition to being effective flame retardant additives, the brominated styrene/butadiene copolymers have other significant advantages over HBCD and other low molecular weight brominated alternatives such as benzene, 1,1'-(1-methylethylidene)bis([3,5-dibromo-4-(2,3-dibromo-2-methylpropoxyl)] (TBBPA). The brominated styrene/butadiene copolymers are rated by the US Environmental Protection Agency as presenting a low hazard for a spectrum of human health effects, and as exhibiting low aquatic toxicity and low bioaccumulation. EPA draft report "Flame Retardant Alternatives for Hexabromocyclododcane (HBCD)", September, 2013.

Cell nucleation and growth can be affected when the foam is made in a melt extrusion process using these alternative brominated flame retardants. The foam often exhibits non-uniformity in its cell structure, especially when the foam is produced at a thickness of about 12 mm or greater. The heterogeneous cell structure results in the foam having denser regions in which the average cell size is somewhat smaller than that of the foam as a whole, and less dense regions in which the average cell size is somewhat larger. These heterogeneities may lead to corresponding inconsistencies in properties in the different regions of the foam body. It is common to form large bodies of extruded foam, and to machine (or "fabricate") these large bodies into smaller parts for specific applications. When the larger foam body has a non-uniform cell structure, the thermal and physical properties of those foam parts can differ from each other quite significantly. This leads to variability in performance and high reject rates.

In some cases, the foam density tends to increase somewhat when a brominated vinyl aromatic/butadiene copolymer is used instead of HBCD as the flame retardant. Higher density foam is more expensive to produce due to increased usage of the resin.

The problem is particularly acute when the extrusion equipment includes an auxiliary cooling device that does not contain forwarding elements, i.e., does not contain moving parts that push the resin/blowing agent mixture towards the die. Such auxiliary cooling devices are very useful commercially, as they allow for higher throughputs. Higher throughputs favor the economics of the process due to faster production rates, and are also important for achieving large foam cross-sections. Therefore, the continued use of auxiliary cooling devices is quite desirable.

It is therefore desirable to find a solution for the problem of cell size heterogeneity in styrenic polymer foams that contain alternative brominated flame retardants. It is especially desirable to find a solution that is effective even when the foam is made in extrusion equipment that has an auxiliary cooling device.

In a first aspect, the present invention is a monolithic foamed polymer composition having a polymeric phase which contains gas-filled cells, wherein the polymer phase comprises (a) one or more thermoplastic, non-brominated styrenic polymers containing no more than 1% polymerized diene monomers, (b) a brominated flame retardant having a molecular weight of at least 1000 g/mol in an amount sufficient to provide 0.25 to 5% by weight bromine based on the combined weights of components (a), (b) and (c), and (c) from 0.1 to 5 parts by weight per part by weight of component (b) of at least one thermoplastic unbrominated vinyl aromatic/butadiene block copolymer containing one or more blocks of polymerized styrene and one or more blocks of polymerized butadiene, the unbrominated vinyl aromatic/butadiene block copolymer containing at least one block of polymerized vinyl aromatic monomer having a molecular weight of at least 20,000 and at least one block of polymerized butadiene having an molecular weight of at least 10,000.

Surprisingly, the inclusion of a small amount of unbrominated vinyl aromatic/butadiene block copolymer as described herein improves cell size homogeneity and can also reduce the density of the foam. As a result, cell sizes and foam densities are often very similar to those seen with similarly-made conventional foams containing HBCD as a flame retardant.

The present invention is also a process for preparing such a foamed polymer composition, comprising, (I) forming a pressurized molten mixture of (a) one or more thermoplastic non-brominated styrenic polymers containing no more than 1% polymerized diene monomers, (b) a brominated flame retardant having a molecular weight of at least 1000 g/mol in an amount sufficient to provide 0.25 to 5% by weight bromine based on the combined weights of components (a), (b) and (c), (c) from 0.1 to 5 parts by weight per part by weight of component (b) of at least one thermoplastic unbrominated vinyl aromatic/butadiene block copolymer containing one or more blocks of polymerized styrene and one or more blocks of polymerized butadiene, the unbrominated vinyl aromatic/butadiene block copolymer containing at least one block of polymerized vinyl aromatic monomer having a molecular weight of at least 20,000 and at least one block of polymerized butadiene having an molecular weight of at least 10,000 and (d) at least one physical blowing agent, wherein the temperature of the molten mixture is greater than the boiling temperature of the physical blowing agent(s) and (II) passing the pressurized molten mixture through an opening into a zone of reduced pressure such that the blowing agent expands and the polymer composition cools and hardens to form the foamed polymer composition.

Figure 1:
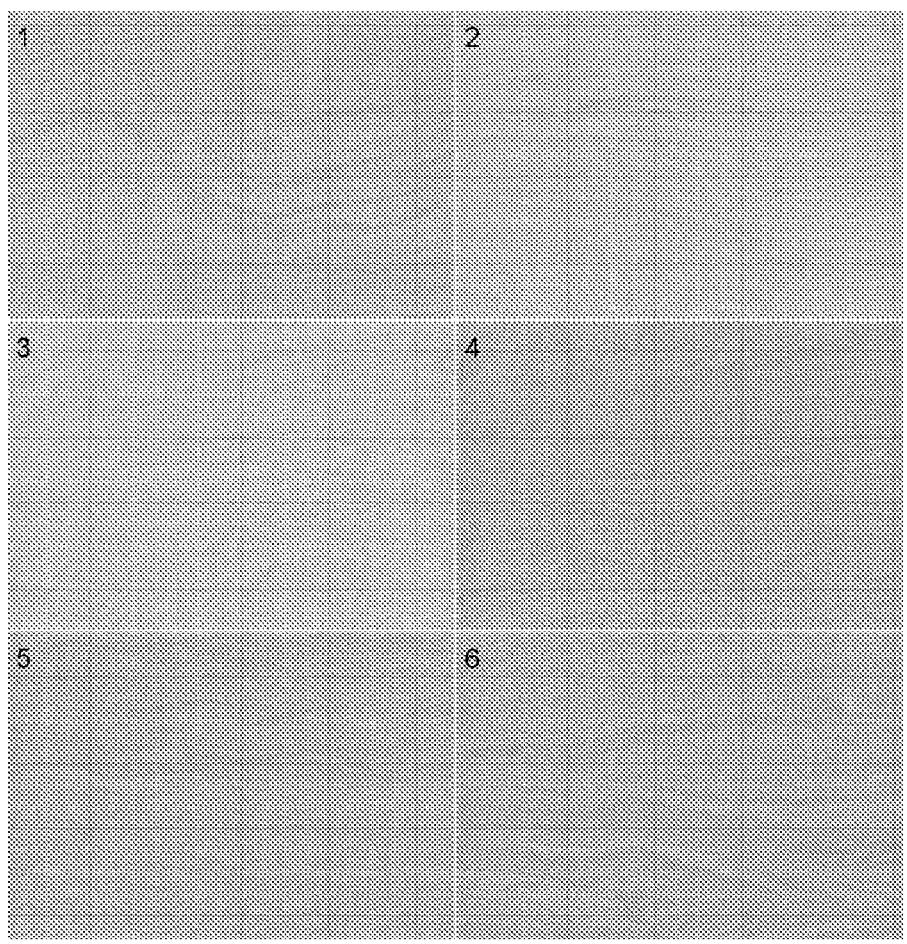
FIG. 1 is a series of images of a prior art polymer foam (Comparative Sample F below).

The thermoplastic non-brominated styrenic polymer is characterized as (1) being thermoplastic, (2) being a polymer or copolymer of one or more vinyl aromatic monomers, in which the polymerized vinyl aromatic monomer(s) constitute at least 50% by weight of the polymer or copolymer; (3) being non-brominated, which for purposes of this invention means the styrenic polymer contains no more than 1 weight percent bromine and (4) containing no more than 1% by weight of polymerized conjugated diene monomer(s). The non-brominated styrenic polymer preferably contains at least 70% by weight polymerized styrenic monomer(s), no more than 0.1% by weight bromine and no more than 0.1% by weight polymerized diene monomer(s).

Vinyl aromatic monomers are compounds having one or more (preferably one) vinyl ($CH_2$=CR—, where R is hydrogen or methyl) group bonded directly to a ring carbon of an aromatic ring structure. These include styrene, α-methylstyrene, 2- or 4-methylstyrene, dimethyl styrene, 2- or 4-ethylstyrene, diethylstyrene, 2- or 4-isopropylstyrene, 2- or 4-chlorostyrene, dichlorostyrene, trichlorostyrene, vinyl toluene, vinyl naphthalene, divinyl benzene, and the like.

In some embodiments the non-brominated styrenic polymer is a homopolymer of a vinyl aromatic monomer, or copolymer of two or more vinyl aromatic monomers. Homopolymers of polystyrene are a preferred type of styrenic polymer.

In other embodiments, the non-brominated styrenic polymer is a copolymer of one or more vinyl monomers and one or more other monomers (i.e., monomers that are not vinyl aromatic monomers). Examples of such other monomers include acrylic and methacrylic monomers such as acrylic acid, methacrylic acid, methyl acrylate, methyl methacrylate, ethyl acrylate, ethyl methacrylate, hydroxyethyl acrylate, hydroxyethyl methacrylate and the like; acrylonitrile; maleic anhydride and itaconic anhydride. A preferred comonomer is acrylonitrile. Styrene-acrylonitrile copolymers containing up to 30% by weight polymerized acrylonitrile with preferred range of 8% to 25% by weight polymerized acrylonitrile are a preferred non-brominated styrenic copolymer.

Component (a) may be a mixture of two or more polymers.

Component (b) is a brominated flame retardant, having a molecular weight of at least 1000, more preferably at least 20,000 g/mol. The brominated flame retardant preferably has one or more bromine atoms bonded to aliphatic carbon atoms. The brominated flame retardant may contain, for example, 10 to 90 weight bromine, 35 to 80% by weight, or 50 to 75% by weight bromine.

Examples of brominated flame retardants include brominated polystyrene; brominated polybutadienes, which may be partially hydrogenated, aryl-terminated or both; brominated allyl ethers of novolac and/or cresol resins; brominated poly(1,3-cycloalkadiene)s; copolymers having styrene and 2,3-dibromopropyemaleimide repeating units, brominated polyesters having aliphatically bound bromine; allyl ethers of ring-brominated novolac resins; 2,3-dibromopropyl ethers of cresol novolac resins, and brominated ROMP polymers or copolymers. Certain of these brominated flame retardants are described in WO 2007/019120 and WO 2009/108453.

A preferred brominated flame retardant is a brominated vinyl aromatic/butadiene copolymer. The brominated vinyl aromatic/butadiene copolymer is a copolymer of butadiene and one or more styrenic monomers as described before, in which at least 50%, more preferably at least 65% of the butadiene units are substituted with at least one bromine atom. The brominated vinyl aromatic/butadiene copolymer preferably contains no more than 1% by weight of aromatically bound bromine. The vinyl aromatic/butadiene copolymer may be a block and/or random type, with block copolymers being preferred. A block copolymer may have a diblock, triblock, star block, asymmetric block or other block structure. Prior to bromination, the butadiene units may constitute 10 to 90 weight percent of the copolymer, especially 25 to 75% by weight. The vinyl aromatic monomer is preferably styrene. The brominated vinyl aromatic/ butadiene copolymer preferably has a 5% weight loss temperature of at least 225° C., as measured by the procedure described in WO 2013/009469. Suitable such brominated vinyl aromatic/butadiene copolymers are also described in WO2008021417, together with methods of making same. A commercially available brominated vinyl aromatic/butadiene copolymer is Emerald Innovation™ 3000 flame retardant from Chemtura Corporation.

The amount of brominated flame retardant having a molecular weight of at least 1000 g/mol is sufficient to provide 0.25 to 5% by weight bromine to the polymer composition, based on the total weight of components a), b) and c). Enough of the brominated flame retardant may be present to provide at least 0.5%, at least 0.8% or at least 1.5% bromine to the polymer composition. The amount of brominated vinyl aromatic/butadiene copolymer may be sufficient to provide up to 3% or up to 2.5% bromine to the polymer component.

Component (c) is one or more unbrominated vinyl aromatic/butadiene block copolymers. By "unbrominated" it is meant that the copolymer contains no more than 1% by weight bromine, and preferably contains no more than 0.1% by weight bromine. Component (c) contains at least one block of polymerized vinyl aromatic monomer having a molecular weight of at least 20,000 g/mol and at least one block of polymerized butadiene having a molecular weight of at least 10,000 g/mol. Component (c) may have at least one block, preferably at least two blocks, of polymerized styrene each having a molecular weight of 30,000 to 75,000 g/mol. Component (c) may have at least one block of polymerized butadiene having a molecular weight from 30,000 to 125,000 g/mol.

Component (c) preferably has a molecular weight of at least 120,000 g/mol.

For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

It is preferred that component (c) contains 50 to 90%, especially 60 to 75%, by weight polymerized vinyl aromatic monomer.

Specific examples of suitable component (c) materials include (1) styrene-butadiene-styrene triblock copolymers containing a central poly(butadiene) block of 30,000 to 100,000 g/mole and terminal polystyrene blocks each having a molecular weight of 20,000 to 100,000 g/mol; (2) styrene-butadiene-styrene triblock copolymers containing a central poly(butadiene) block of 40,000 to 75,000 g/mol molecular weight and terminal polystyrene blocks each having a molecular weight of 40,000 to 75,000 g/mol; and (3) styrene-butadiene diblock copolymers in which the polystyrene block has a molecular weight of 30,000 to 75,000 g/mol and the poly(butadiene) block has a molecular weight of 40,000 to 100,000 g/mol. In each of these cases, it is preferred that the copolymer contains 50 to 90%, more preferably 60 to 70% by weight polymerized styrene. In each of these cases, the copolymer preferably has a molecular weight of at least 125,000, more preferably 125,000 to 200,000 g/mol.

The unbrominated vinyl aromatic/butadiene copolymer is present in an amount of 0.5 to 5 parts by weight per part by weight of component (b). A preferred amount is 0.5 to 3 parts and a more preferred amount is 0.75 to 2 parts on the same basis.

The polymeric composition can contain additional additives as described, for example, in WO2012/082332. Such additional additives may include, for example, non-brominated flame retardants such as described, for example, in U.S. Pat. No. 4,070,336, U.S. Pat. No. 4,086,205, U.S. Pat. No. 4,255,324, U.S. Pat. No. 4,268,459, U.S. Pat. No. 4,278,588, WO 2009/035880 and WO 2009/035881; brominated flame retardants having a molecular weight of less than 1000 g/mol; flame retardant synergists (such as dicumyl or polycumyl) as described, for example, in US 2011-0196053, extrusion aids, cell size control agents including polymers such as polyethylene and polyethylene wax, pigments, inorganic fillers, and infrared attenuating agents (such as carbon black, graphite and titanium dioxide). Useful stabilizers include antioxidants and acid scavengers such as magnesium oxide, epoxy resin(s), phosphite compounds and phosphate compounds. Examples of extrusion aids include plasticizers include, for example, metal salts of stearic acid such as barium stearate.

A polymer foam is made from the foregoing polymer composition by forming a pressurized molten mixture of components (a), (b) and (c) as described above, together with (d) at least one physical blowing agent. The blowing agent may be, for example, propane, n-butane, isobutane, industrial butane (a mixture of n-butane and isobutane), n-pentane, isopentane, cyclopentane and neopentane, an alkyl chloride such as methyl chloride and ethyl chloride; an aliphatic ether such as dimethyl ether, diethyl ether, methyl ethyl ether, isopropyl ether, n-butyl ether, diisopropyl ether, furan, furfural, 2-methyl furan, tetrahydrofuran and tetrahydropyran; a ketone such as dimethyl ketone, methyl ethyl ketone, diethyl ketone, methyl n-propyl ketone, methyl n-butyl ketone, methyl isobutyl ketone, methyl n-amyl ketone, methyl n-hexyl ketone, ethyl n-propyl ketone and ethyl n-butyl ketone; an alcohol such as methanol, ethanol, n-propanol, isopropanol, n-butanol, isobutanol and t-butanol; a carboxylic acid ester such as methyl formate, ethyl formate, propyl formate, butyl formate, amyl formate, methyl propionate and ethyl propionate; a fluorocarbon such as R-134a, a fluorinated olefin; a chlorinated olefin; carbon dioxide and water.

A preferred blowing agent is a mixture of carbon dioxide, at least one isomer of butane and ethyl chloride. Another preferred blowing agent is a mixture of R-134a, carbon dioxide and water.

In some embodiments, enough of the physical blowing agent is provided to achieve a foam density of from 16 to 80 kg/m$^3$ (1 to 5 pounds/cubic foot). Preferably, enough of the blowing agent is provided to achieve a foam density of 24 to 50 kg/m$^3$, especially 24 to 45 kg/m$^3$. Typically 5 to 20 parts by weight of the blowing agent(s) is sufficient to achieve these densities, although the exact amounts needed will vary depending on the particular blowing agents.

The temperature of the molten mixture is greater than the boiling temperature of the physical blowing agent(s) and sufficient to heat-plasticize the polymeric components. The molten mixture is then passed through an opening into a zone of reduced pressure such that the blowing agent expands and the polymer composition cools and hardens to form the foamed polymer composition. A common apparatus for performing these steps is an extruder. Extruders typically have a barrel with one or more ports through which starting materials are introduced, heating means to supply heat to heat-plasticize the polymeric materials, means (typically one or more longitudinal rotating screws) for transporting the materials along the longitudinal length of the barrel and in most cases also for mixing the starting materials, and an outlet (typically a die) through which the heat-plasticized mixture exits the extruder barrel to a zone of reduced pressure.

The extruder may also include means at or just upstream from the die for cooling the molten mixture to an optimal temperature as it passes through the die. In some embodiments, the foaming apparatus includes an auxiliary cooling device which lacks forwarding elements. Such an auxiliary cooling device may be entirely static (i.e., have no internal moving parts that come into contact with the molten mixture), or may having moving mixing elements that do not provide significant forwarding of the material in the direction of the die. Examples of auxiliary cooling devices are described, for example, in U.S. Pat. Nos. 4,222,729, 4,324,493 and 4,454,087.

The starting materials may be supplied individually to the foaming apparatus, or may be supplied in various subcombinations. It is sometimes convenient to form a masterbatch of the brominated flame retardant having a molecular weight of at least 1000 g/mol in all or a portion of component (a). Similarly, a masterbatch of the unbrominated styrene-butadiene polymer may be formed in all or a portion of component (a). All of components (a), (b) and (c) may be formed into a single masterbatch. A masterbatched material may be formed into pellets or other particulates which are fed into the foaming apparatus and heat-plasticized. Alternatively, a masterbatched material may be fed into the foaming apparatus already in heat-plasticized form. One way of performing the latter approach is to provide two extruders in tandem. Components (a), (b) and (c) are heat-plasticized and mixed in the first extruder, and then passed in heat-plasticized form into the second extruder, where they are mixed with the blowing agent under pressure sufficient to prevent the blowing agent from expanding. The resulting pressurized mixture is then formed into foam by passing it through a die or other opening into a zone of reduced (relative to the extruder pressure) such that the blowing agent expands the polymer composition and the polymer composition cools and hardens.

Ingredients other than components (a), (b) and (c) can be added during the foaming process or masterbatched with one or more of components (a), (b) or (c) (or any portion thereof) prior to the foaming process.

In industrial processes, the foam expansion is mainly in the vertical direction, which corresponds to the thickness of the foam product as extruded. The problem of foam heterogeneity described above is manifested mainly in extruded foams having extrusion thicknesses (i.e., vertical expansions) of at 12 mm or more. The problem tends to become more severe with increasing extrusion thicknesses. Therefore, in some embodiments, the extrusion thickness is at least 12 mm, at least 25 mm or at least 37 mm. In some embodiments, the extrusion thickness is up to 300 mm or up to 160 mm.

The polymer foam of the invention is monolithic, by which it is meant a foam have a continuous polymer phase without seams or joints between sections of the foam. A foam made in an extrusion process is monolithic in this sense. The continuous polymer phase contains gas-filled cells. The polymer phase contains components (a), (b) and (c). The average cell size may be at least 0.1 mm as measured by ASTM D3576-04. Cell sizes for purpose of this invention are arithmetic averages of the cell dimensions in the extrusion direction, transverse direction and vertical directions. A preferred average cell size is at least 0.1 mm and a more preferred cell size is at least 0.2 mm. The average cell size is preferably no greater than 4 mm, and more preferably no greater than 2 mm. An advantage of this invention is the average cell size typically is somewhat larger than an otherwise identical foam (i.e., one made using the same ingredients and under the same processing conditions) made without the unbrominated vinyl aromatic/butadiene copolymer. The increase in cell size tends to be on the order of 0.02 to 0.3 mm.

The density of the resulting polymeric foam is preferably 16 to 80 kg/m$^3$, more preferably 24 to 50 kg/m$^3$, and in some embodiments 24 to 45 kg/m$^3$, as measured according to ASTM method D1622-08. An advantage of this invention is foam density is typically lower than that of an otherwise identical foam made without the unbrominated vinyl aromatic/butadiene copolymer, often by about 1 to 10%. This reduction in density can result in a significant raw materials savings.

Another important benefit of the invention is that the cell structure (cell size) tends to be more uniform throughout the foam body than when the unbrominated styrene-butadiene copolymer is omitted. This difference is readily apparent on visual inspection of the foam. Foam made without the unbrominated vinyl aromatic/butadiene copolymer exhibit visible striations that correspond to the lower and high density regions. The number and intensity of the striations is reduced when the unbrominated vinyl aromatic/butadiene copolymer is present.

Cellular homogeneity can be quantified optically using the following method. The foam is sliced vertically (in the direction of vertical expansion during the foaming process) to form a 1 mm thick section of foam. This section is held between glass plates and illuminated from behind with a collimated light source (such as Advanced Illumination CB0606-WHI). Room light is removed to improve contrast. Images are collected on a digital camera. The images are cropped to isolate the image of the center of the foam to avoid analyzing edge effects. The image is converted from RGB color representation to monochrome using the weighted conversion of gray=0.3×Red+0.3×Green+0.4× Blue. The full-image mean intensity (mean) is determined using Image J or equivalent software. The image is then down-sampled using pixel boxes that image a square area of foam 2-3 mm on a side. The magnification preferably is such that this foam area is imaged in a pixel box about 80-120 pixels square. The standard deviation of the down-sampled image is calculated, and the % relative standard deviation (% RSD) is calculated as % relative standard deviation=100%× (standard deviation/mean). The relative standard deviation is a measure of the homogeneity of the sample, with a lower % RSD indicating greater homogeneity (and thus the potential for better foam properties as discussed above).

Comparisons between foam samples that, respectively, contain and do not contain the component (c) material can be expressed as a Differential Homogeneity Index (DHI). DHI is calculated according to the formula:

$$DHI(\%) = \frac{\%RSD_{without\ SBS} - \%RSD_{with\ SBS}}{\%RSD_{without\ SBS}} \times 100$$

provides a convenient means to judge the improvement in cellular homogeneity. DHI values greater than zero indicate an improvement in cellular homogeneity. DHI values are preferably at least 10 and more preferably at least 20.

The foam of the invention can have any proportion of closed cells. In some embodiments, the foam has an open cell content of 30% or less, preferably 10% or less, 5% or less, or even 1% or less, as determined according to ASTM method D6226-10.

The following examples are provided to illustrate the invention, not to limit the scope thereof. All parts and percentages are by weight unless otherwise indicated.

Styrenic Polymer A is a polystyrene homopolymer having a weight average molecular weight of about 195,000 g/mol and a polydispersity of about 2.7. It contains no measurable bromine.

Styrenic Polymer B is a polystyrene homopolymer having a weight average molecular weight of about 202,000 g/mol and a polydispersity of about 2.5. It contains no measurable bromine.

Styrenic Polymer C is a poly(styrene-co-acrylonitrile) copolymer having a weight average molecular weight of about 112,000 g/mol and a polydispersity of about 2.3. It contains no measurable bromine. Styrenic Polymer C contains 15.5% acrylonitrile by weight.

Styrenic Polymer D is a poly(styrene-co-acrylonitrile) copolymer having a weight average molecular weight of about 144,000 g/mol and a polydispersity of about 2.4. It contains no measurable bromine. Styrenic Polymer C contains 15.5% acrylonitrile by weight.

The Brominated Copolymer is a styrene-butadiene-styrene triblock copolymer which is brominated on the butadiene block. It contains 64% by weight bromine, essentially all of which is bonded to aliphatic carbon atoms. This material has a softening point of 120° C., a molecular weight of 100,000-160,000 g/mol and a 5% weight loss temperature by thermogravimetric analysis of 262° C. This copolymer is available commercially as Emerald Innovation™3000 fire retardant (Chemtura Corporation).

SBS Copolymer A is a triblock copolymer containing 70.3% by weight polystyrene blocks. It has a molecular weight of 164,000 g/mol. The styrene blocks have a molecular weight of approximately 57,500, and the central poly (butadiene) block has a molecular weight of about 49,000. SBS Copolymer A contains no measurable bromine. SBS Copolymer A is available commercially as Asaflex™ 810 from Asahi Kasei.

SBS Copolymer B is a triblock copolymer containing 33% by weight polystyrene blocks. It has a molecular weight of 127,000 g/mol. The styrene blocks have a molecular weight of approximately 21,000, and the central poly(butadiene) block has a molecular weight of about 85,000. It contains no measurable bromine.

SBS Copolymer C is a triblock copolymer containing 34% by weight polystyrene blocks. It has a molecular weight of 82,000 g/mol. The styrene blocks have a molecular weight of approximately 14,000, and the central poly(butadiene) block has a molecular weight of about 54,000. It contains no measurable bromine.

SBS Copolymer D is a triblock copolymer containing 98.2% by weight polystyrene blocks. It has a molecular weight of 132,000 g/mol. The styrene blocks have a molecular weight of approximately 65,000, and the central poly (butadiene) block has a molecular weight of about 3,000. It contains no measurable bromine.

EXAMPLES 1-3 AND COMPARATIVE SAMPLES A-E2

Examples 1-3 and Comparative Samples A-E2 are prepared from the following standard formulation:

| Ingredient | Parts by Weight |
|---|---|
| Styrenic Polymer A | 100 |
| Carbon Dioxide | 2.5 |
| Isobutane | 0.7 |
| n-Butane | 1.3 |
| Ethyl Chloride | 5 |
| Process Additives[1] | 1.52 |
| Brominated Copolymer | 2.85 |
| SBS Copolymer | Various |

[1]Lubricants, antioxidants, stabilizers, pigments, and cell control additives.

The foamable polymer mixture is processed on a pilot-scale foam extrusion line equipped with an auxiliary cooling device and a slit die. The styrenic polymer, brominated copolymer, SBS Copolymer, blowing agents and additives are blended at a temperature of approximately 200-205° C. and at a pressure sufficient to preclude expansion of the blowing agents.

The solids feed rate is 11.9 kilograms per hour per centimeter of die gap width. The melt is brought to a temperature of 109° C. and pressure of 7.1 MPa. The melt is discharged through a slit die into atmospheric pressure (101 kiloPascals) where it expands vertically to a thickness of about 40 mm and allowed to cool to ambient temperature (approximately 20-25° C.). In each case, a control is run without the SBS resin until steady-state conditions are established on the foam line. Then, samples are taken for physical property testing as described below and, without discontinuing operation, additional foam is made in the same manner except the SBS is fed into the extruded along with the other ingredients.

In each case, cell size (average of all three dimensions) is measured according to ASTM D3576-04. Core foam density is measured according to ASTM D1622-08. Limiting oxygen index is measured according to ASTM D2863-13. Cellular homogeneity is evaluated according to the method described above.

Results are as indicated in Table 2:

TABLE 2

| Designation | SBS (type, parts per part flame retardant) | Nominal % Br relative to total solids | Cell Size, mm | Density, kg/m³ | LOI, % | Cellular Homogeneity | |
|---|---|---|---|---|---|---|---|
| | | | | | | % RSD | DHI % |
| A* | None | 1.9 | 0.91 | 34.1 | 31 | 2.59 | — |
| 1 | A/1 | 1.9 | 0.97 | 33.6 | 31 | 1.96 | 24 |
| B* | None | 1.9 | 0.78 | 35 | 31 | 2.14 | — |
| 2 | A/0.5 | 1.9 | 0.8 | 33.6 | 31 | 1.91 | 11 |
| C* | None | 1.9 | 0.67 | 35.7 | 32 | 2.27 | — |
| 3 | B/0.5 | 1.9 | 0.77 | 34.8 | 26 | 1.93 | 14 |
| D-1* | None | 1.9 | 0.68 | 34.9 | 31 | 2.30 | — |
| D-2* | C/0.5 | 1.9 | 0.85 | 33.3 | 28 | 2.44 | -6 |
| E-1* | None | 1.9 | 0.84 | 33.8 | 31 | 1.36 | — |
| E-2* | D/0.5 | 1.9 | 0.82 | 33.1 | 31 | 1.33 | 2 |

Example 1 and Comparative Sample A are direct comparisons. The results of these two experiments shows that by adding the unbrominated SBS Copolymer A in the same amount as the flame retardant, one obtains a foam having larger cells, lower density, and essentially the same limiting oxygen index. Example 1 is far more homogeneous than Comparative Sample A.

Example 2 illustrates the effect of using the SBS Copolymer A at one-half the amount of flame retardant. Cell size is increased slightly, and foam density decreases significantly, compared to the corresponding control (Sample B). Example 2 is more homogeneous than the control. There is little effect on limiting oxygen index.

Example 3 illustrates the effect of using SBS Copolymer B. This SBS resin increases cell size, reduces density and improves homogeneity compared to the corresponding control (Sample C). However, SBS Copolymer B is less preferred than the SBS Copolymer A used in Examples 1 and 2, because it has more of an adverse effect on limiting oxygen index. The decrease in limiting oxygen index may be due to the high butadiene content of this particular SBS material.

Comparative Samples D-2 and E-2 show the effect of adding SBS Copolymers C and D. SBS Copolymer C (Comparative Sample D-2) has a significant effect on cell size and density, but has little effect on homogeneity and in addition has a significant adverse effect on limiting oxygen index (all compared to the corresponding control, Sample D-1). The poorer results may be due to the short length (about 14,000 molecular weight) of the styrene blocks of SBS Copolymer C.

SBS Copolymer D (Comparative Sample E-2) has little effect on cell size, a small effect on density, and little effect on homogeneity and limiting oxygen index. The poly(butadiene) content of SBS Copolymer D may be too small to provide a significant positive effect.

EXAMPLE 4 AND COMPARATIVE SAMPLE F

Example 4 and Comparative Sample F are prepared on production-scale extrusion foaming apparatus including an auxiliary cooling device, using the following formulations:

| | Sample | |
|---|---|---|
| Ingredient | Comparative Sample F* Parts by Weight | Example 4 |
| Styrenic Polymer B | 100 | 100 |
| Carbon Dioxide | 2.8 | 2.9 |
| Isobutane | 0.7 | 0.7 |
| n-Butane | 1.3 | 1.3 |
| Ethyl Chloride | 4.2 | 4.2 |
| Process Additives[2] | 1.2 | 1.2 |
| Brominated Copolymer | 1.64 | 1.56 |
| SBS Copolymer A | None | 1.8 |

[2]Lubricants, antioxidants, stabilizers, pigments, flame retardant synergists, and cell control additives.

The foamable polymer mixture is prepared by melt blending together the styrenic polymer, blowing agents and additives at a temperature of approximately 215° C. and at a pressure sufficient to preclude expansion of the blowing agents. The solids feed rate is 43.8 and 44.3 kilograms per hour per centimeter of die gap width for Comparative Sample F and Example 4, respectively. In both cases, 34% of the total solids are recycled. The melt is brought to a temperature of 112° C. and pressure of 5.1 and 5.6 MPa for Comparative Sample F and Example 4 respectively. The melt is discharged through a slit die into atmospheric pressure (101 kiloPascals) where it expands in the vertical dimension to a thickness of about 40 mm and allowed to cool to ambient temperature (approximately 20-25° C.).

Comparative Sample F is run until steady-state conditions are established on the foam line. Then, samples are taken for physical property testing as described below and, without discontinuing operation, additional foam (Example 4) is made in the same manner except SBS Copolymer A is fed into the extruded along with the other ingredients.

Cell size (average of all three dimensions) and core foam density is measured as described above. Cellular homogeneity is evaluated according to the method described above. Due to the width of these production scale samples, the foam is cut into six sections for homogeneity analysis. The % RSD values are an average of all six sections.

Results are as indicated in Table 3:

TABLE 3

| Designation | SBS (type, parts per part flame retardant) | Nominal % Br relative to total solids | Cell Size, mm | Density, kg/m³ | Cellular Homogeneity % RSD | DHI % |
|---|---|---|---|---|---|---|
| F* | None | 1.1 | 0.53 | 26.3 | 1.9 | — |
| 4 | A/1.15 | 1.0 | 0.61 | 26.5 | 1.3 | 32 |

Figure 2:
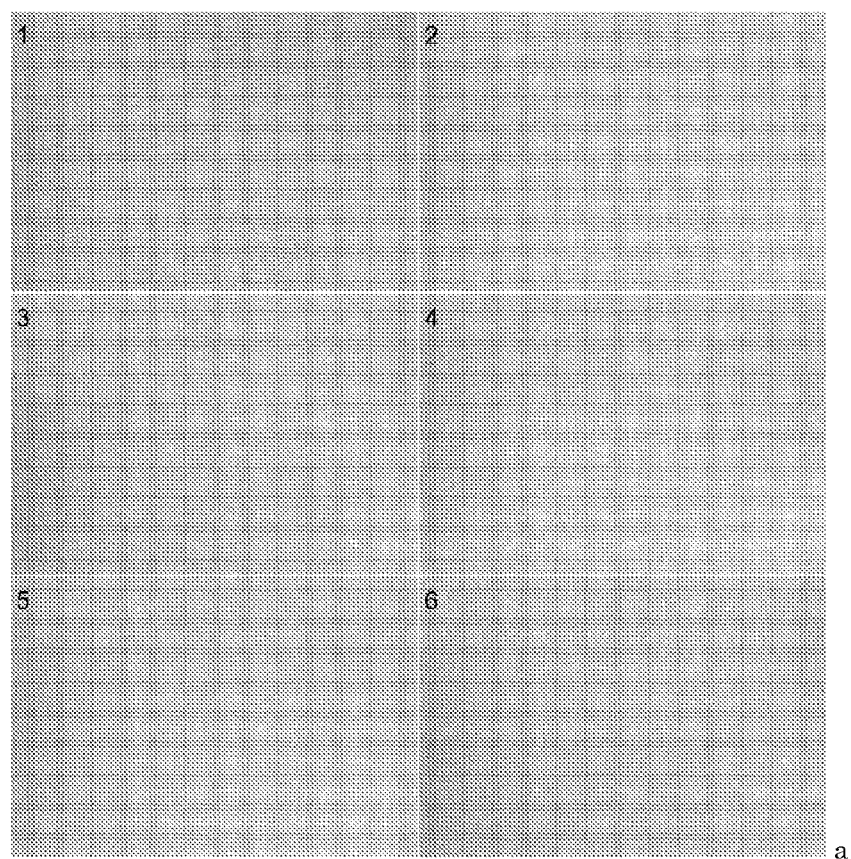
FIG. 2 is a series of images of a polymer foam of the invention (Example 4 below).

FIGS. 1 and 2 are images of six vertical slices of Comparative Sample F and Example 4, respectively. Each image in FIGS. 1 and 2 is of a 145 mm×100 mm cross-section of the foam. As seen in FIG. 1, Comparative Sample F is highly striated. The striations correspond to distinct regions of larger cell size/lower foam density and separate distinct regions of small cell size/higher foam density. As seen in FIG. 2, the striations are greatly reduced in Example 4, due to the presence of SBS Copolymer A.

The results of these two experiments shows that by adding SBS Copolymer A at a slightly higher loading than the flame retardant, one obtains a foam having larger cells and lower density. Example 4 is far more homogeneous than Comparative Sample F, as shown by the high DHI value.

EXAMPLE 5 AND COMPARATIVE SAMPLE G

Example 5 and Comparative Sample G are prepared using the following formulations:

| Ingredient | Parts by Weight | |
|---|---|---|
|  | Comp. Sample G | Ex. 5 |
| Styrenic Polymer C | 50 | 50 |
| Styrenic Polymer D | 50 | 50 |
| Carbon Dioxide | 1.4 | 1.4 |
| Water | 1.1 | 1.1 |
| 1,1,1,2 Tetrafluoroethane (HFC-134a) | 6.7 | 6.7 |
| Process Additives³ | 0.9 | 0.9 |
| Brominated Copolymer | 0.91 | 0.91 |
| SBS Copolymer A | 0 | 1.43 |

³Lubricants, antioxidants, stabilizers, pigments, and cell control additives.

The ingredients are melt processed in the same general manner described with respect to Examples 1-3 and Comparative Samples A-E2, except the melt is brought to a temperature of 130° C. and pressure of 7.3 and 7.1 MPa for Comparative Sample G and Example 5 respectively. The melt is discharged through a slit die into atmospheric pressure (101 kiloPascals) where it expands in the vertical dimension to a thickness of 24 mm and allowed to cool to ambient temperature into air at 20-25° C. Cell size (average of all three dimensions), core foam density, and LOI are measured as described above. Cellular homogeneity is evaluated in a like manner as Examples 1-3. Results are as indicated in Table 4:

TABLE 4

| Designation | SBS (type, parts per part flame retardant) | Target % Br relative to total solids | Cell Size, mm | Density, kg/m³ | LOI, % | Cellular Homogeneity % RSD | DHI % |
|---|---|---|---|---|---|---|---|
| G* | None | 0.6 | 0.16 | 31.4 | 26 | 3.3 | — |
| 5 | A/1.57 | 0.6 | 0.26 | 28.4 | 26 | 2.7 | 18 |

Adding SBS Copolymer A produces a foam with larger cells, lower density and greater homogeneity.

What is claimed is:

1. A monolithic foamed polymer composition having a polymeric phase which contains gas-filled cells, wherein the polymer phase comprises:
    (a) one or more thermoplastic, non-brominated styrenic polymers containing no more than 1% polymerized diene monomers,
    (b) a thermoplastic brominated vinyl aromatic/butadiene copolymer having a molecular weight of at least 1000 g/mol in an amount sufficient to provide 0.25 to 5% by weight bromine based on the combined weights of components (a), (b) and (c), and
    (c) from 0.1 to 5 parts by weight, per part by weight of component (b) of at least one thermoplastic unbrominated vinyl aromatic/butadiene block copolymer selected from the group consisting of a thermoplastic unbrominated styrene-butadiene-styrene triblock copolymer containing a central poly(butadiene) block of 30,000 to 100,000 g/mol and terminal polystyrene blocks each having a molecular weight of 20,000 to 100,000 g/mol and a thermoplastic unbrominated styrene-butadiene diblock copolymer in which the polystyrene block has a molecular weight of 30,000 to 75,000 g/mol and the poly(butadiene) block has a molecular weight of 40,000 to 100,000 g/mol.

2. The monolithic foamed polymer composition of claim 1 which is an extruded foam having a thickness in the direction of expansion of at least 12 mm.

3. The monolithic foamed polymer composition of claim 1, wherein the thermoplastic unbrominated vinyl aromatic/butadiene block copolymer is the styrene-butadiene-styrene triblock copolymer containing a central poly(butadiene) block of 30,000 to 100,000 g/mol and terminal polystyrene blocks each having a molecular weight of 20,000 to 100,000 g/mol.

4. The monolithic foamed polymer composition of claim 1, wherein the thermoplastic unbrominated styrene-butadiene-styrene triblock copolymer contains a central poly(butadiene) block of 40,000 to 75,000 g/mol molecular weight and terminal polystyrene blocks each having a molecular weight of 40,000 to 75,000 g/mol.

5. The monolithic foamed polymer composition of claim 1, wherein the thermoplastic unbrominated vinyl aromatic/butadiene block copolymer is the styrene-butadiene diblock copolymer in which the polystyrene block has a molecular weight of 30,000 to 75,000 g/mol and the poly(butadiene) block has a molecular weight of 40,000 to 100,000 g/mol.

6. The monolithic foamed polymer composition of claim 1, wherein the amount of component (b) is sufficient to provide at least 0.5 weight % bromine based on the combined weights of components (a), (b) and (c).

7. The monolithic foamed polymer composition of claim 1, wherein component (a) is polystyrene, a copolymer of at least 70% weight percent styrene and up to 30 weight percent acrylonitrile, or a mixture thereof.

8. A process for preparing the monolithic foamed polymer composition of claim 1, comprising
   (I) forming a pressurized molten mixture of:
      (a) one or more thermoplastic non-brominated styrenic polymers containing no more than 1% polymerized diene monomers,
      (b) a brominated flame retardant having a molecular weight of at least 1000 g/mol in an amount sufficient to provide 0.25 to 5% by weight bromine based on the combined weights of components (a), (b) and (c),
      (c) from 0.1 to 5 parts by weight per part by weight of component (b) of at least one thermoplastic unbrominated vinyl aromatic/butadiene block copolymer selected from the group consisting of a thermoplastic unbrominated styrene-butadiene-styrene triblock copolymer containing a central poly(butadiene) block of 30,000 to 100,000 g/mol and terminal polystyrene blocks each having a molecular weight of 20,000 to 100,000 g/mol and a thermoplastic unbrominated styrene-butadiene diblock copolymer in which the polystyrene block has a molecular weight of 30,000 to 75,000 g/mol and the poly(butadiene) block has a molecular weight of 40,000 to 100,000 g/mol, and
      (d) at least one physical blowing agent, wherein the temperature of the molten mixture is greater than the boiling temperature of the physical blowing agent(s); and
   (II) passing the pressurized molten mixture through an opening into a zone of reduced pressure such that the blowing agent expands and the polymer composition cools and hardens to form the foamed polymer composition.

9. The process of claim 8 wherein in step (II) the foamed polymer composition has a thickness of at least 12 mm in the direction of expansion.

10. The process of claim 8 wherein the amount of component (b) is sufficient to provide at least 0.5 weight % bromine based on the combined weights of components (a), (b) and (c).

11. The process of claim 8 wherein component (a) is polystyrene, a copolymer of at least 70% weight percent styrene and up to 30 weight percent acrylonitrile, or a mixture thereof.

12. The process of claim 8 wherein step (I) is performed in an extrusion apparatus equipped with an auxiliary cooling device.

* * * * *